Figure 1:
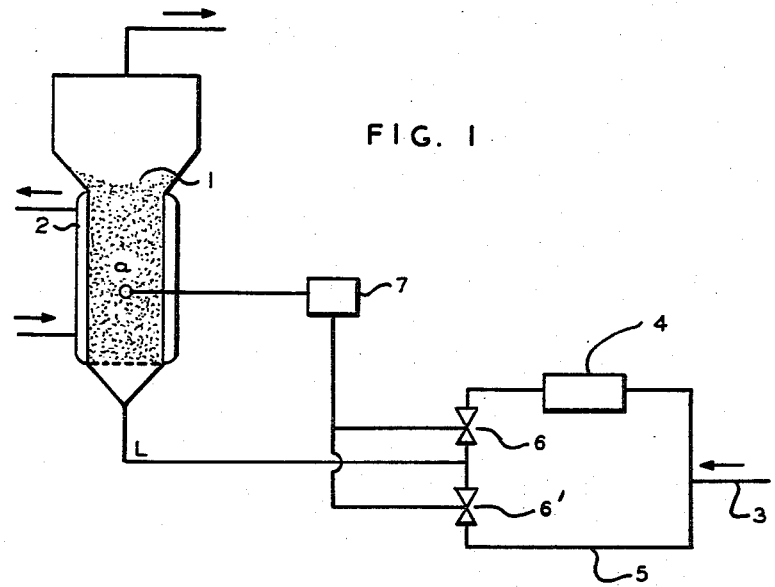

Jan. 14, 1964 JUN ADACHI ETAL 3,117,990
PROCESS OF PRODUCING VINYL COMPOUNDS
Filed Sept. 6, 1960

INVENTORS
JUN ADACHI
SHOGO FUJITA
AKIO MITSUTANI
KEIGO KIMURA
AKIO NAGANUMA
BY Maynard L. Youngs
ATTORNEY

3,117,990
PROCESS OF PRODUCING VINYL COMPOUNDS

Jun Adachi, Ashiya City, Shogo Fujita, Okayama City, Akio Mitsutani, Kurashiki City, Keigo Kimura, Toyama City, and Akio Naganuma, Tamashima City, Japan, assignors to Kurashiki Rayon Co., Ltd., a corporation of Japan
Filed Sept. 6, 1960, Ser. No. 54,017
Claims priority, application Japan Sept. 4, 1959
1 Claim. (Cl. 260—498)

This invention relates to the synthesis of vinyl compounds and is more particularly concerned with the synthesis of vinyl esters, such as vinyl acetate.

In the vapor-phase synthesis of vinyll acetate, vinylchloride, and the like, the temperature of the reaction system lacks stability and uniformity of distribution due to the temperature changes caused by the heat of reaction. Vinyl acetate, for example, is produced by the vapor-phase reaction between acetylene and acetic acid, as described, for example, in Freed U.S. Patent 2,411,962.

Catalytic reaction vessels used in industry for the snythesis of vinyl acetate and like reactions have been generally classified into two types, viz. static bed catalytic reaction vessels and fluidized catalytic reaction vessels.

The conventional static catalytic reaction vessels are of the multi-pipe type or are of the box type, wherein particles of the catalyst making up the reaction beds are packed in layers in the vessel, and the predetermined reaction temperature is maintained by introducing a heat-transfer medium in the clearance between the catalyst layers, thereby effecting heat exchange between the heat-transfer medium and the catalyst layers. In apparatus of this character, the heat-conducing area per unit amount of catalyst can be made large enough to permit the maintenance of a relatively steady reaction temperature if the temperature of the heat transfer medium is kept at a constant value. While this is a favorable factor, the static system is not free from serious drawbacks arising from the unevenness of the temperature distribution within the reaction or catalyst layers. Even though the heat-conducting surface area is sufficiently great with respect to the reaction layers, and even though the reaction temperature can be generally stabilized for prolonged periods of time, the undesirable unevenness of distribution of the reaction temperature within the layers is very difficult to avoid in both lateral and longitudinal directions. As a result, uniform reaction is not carried out throughout the catalyst layers. Concentric deterioration or solidification of the layers of catalyst is accelerated, thereby causing a degradation in the qualities of the reaction products. In addition, it is very difficult to remove the aged catalysts after the apparatus has been shut down.

Fluidized catalytic reaction vessels are built in accordance with the principle that the particles of catalyst are agitated by hydrodynamic and mechanical methods, the hydrodynamic fluidized catalytic reaction vessel being a representative example. Its simple construction in comparison with the static system, and the markedly improved uniformity of temperature distribution in the reaction layers which is made possible, are some of the favorable characteristics of the fluidized catalytic reaction vessel.

For the purpose of heat transmission, reaction vessels employing the fluidized catalyst system are usually equipped with a jacket for circulation of a heat-transfer medium at the outer periphery of the reaction bed. However, taking the synthesis of vinyl acetate as an example, it becomes difficult, as larger and larger reaction vessels are employed, to control the fluctuations in the reaction temperature, and to keep it constant only by means of the heat-transfer medium in the jacket, even though a uniform distribution of the reaction temperature is obtained, and even though the temperature within the catalyst bed can temporarily be adjusted by providing a sufficient difference between the temperature of the heat-transfer medium and the reaction temperature. The heat-transmitting surface area per unit amount of catalyst for the disposal of the reaction heat generated falls short of that which is found in the static catalytic reaction vessel, both in the case of industrial scale application, and in the case of small-scale reaction vessels.

When substantial heat is evolved, it becomes necessary, with increasing size of the reaction vessel, to increase the difference between the reaction temperature and that of the heat-transfer medium. However, a limit is imposed in practice on the magnitude of the temperature difference which can be created. Large temperature differences are not satisfactorily realized and, as a result, the use of large fluidized reaction vessels for the synthesis of vinyl acetate and the like has not heretofore been practicable.

It is accordingly an object of the present invention to provide an improved method for synthesizing vinyl acetate and like compounds involving fluidization techniques.

It is another object of the invention to provide a method of the character indicated whereby uniform temperature conditions can be obtained when a fluidized catalyst system is employed regardless of the size of the reaction vessel.

In accordance with the method of the present invention, the heat of reaction is absorbed by controlling the temperature, as by preheating, of the low temperature gases introduced into the fluidized reaction system without impairing the temperature distribution of the reaction layers in the fluidized bed normally resulting from the introduction of the raw material gases, the temperature of which is lower than the reaction temperature, directly into the lower portion of the fluidized bed. Thus, the temperature is stabilized by regulating the temperature of the low-temperature gases introduced into the reaction vessel. In this method, the property of the fluidized catalyst layers, always forming layers of a uniformly-distributed temperature gradient, is utilized. The fact that the heat capacity of the raw material gases consisting of acetic acid vapor and acetylene vapor has a value corresponding to the calorific quantity generated by the vinyl acetate synthesis reaction, makes the application of this method very advantageous in the production of vinyl acetate.

Thus, we do not rely on heat transmission to the heat-transfer medium through the heat transmitting surfaces in the reaction vessel conventionally used for synthesizing vinyl acetate by the fluidized catalytic process. When the temperature of the raw material gases introduced at the inlet of the reaction zone defined by the vessel is kept below the predetermined reaction temperature, the temperature distribution within the fluidized layers is simultaneously made uniform as the result of the violent agitating action brought about by the gases introduced. Accordingly, a local depression of temperature is not caused by the low temperature gases introduced at the bottom of the catalyst bed, and the heat generated in the reaction vessel is absorbed in raising the temperature of the lower temperature raw material gases to the reaction temperature. We have also discovered that the control of the reaction temperature can be effected most effectively and efficiently, in contrast to conventional methods, by regulating the temperature of the raw material gases entering at the inlet of the reaction vessel in direct response to variations in the reaction temperature in the reaction zone itself.

In carrying out the method of this invention, the temperature of the heat-transfer medium used as the cooling medium in the jacket or in tubes extending into the fluidized layers of the reaction vessel used for synthesizing vinyl acetate, when such heat-transfer medium is used, does not have to be kept at a value below the reaction temperature, and it can be selected to correlate with the temperatures of the raw material gases introduced into the reaction vessel. Accordingly, one of the characteristic features of this invention is that, in addition to its adaptability to the purposes of controlling the reaction temperature, it permits the temperature of the heat-transfer medium to be kept at a temperature equal to the reaction temperature by selecting suitable temperatures at which to maintain the gases introduced into the reaction vessel. This method thus enables the realization of an ideal state in which the temperature distribution within the fluidized reaction layers can be kept completely uniform, including the wall surfaces at the outer periphery of the fluidized bed. In this case, owing to the absence of a temperature difference between the heat-transfer medium and the fluidized reaction layers, no heat-exchange occurs, and the jacket no longer acts as a cooling surface but, rather, as a type of adiabatic surface. The temperature of the gases introduced, in this embodiment of the method, may be determined from the relation between the heat capacity of the gases introduced and the generated heat of reaction.

When the heat-controlling method of this invention is put into practice, it becomes possible to employ reaction vessels of large capacity. This has been beyond practical possibility with conventional static or fluidized catalytic reaction vessels, wherein the reaction temperature is controlled solely by means of a heat-transfer medium. With increasing size of the reaction vessel, the heat transmitting area of the vessel jacket per unit amount of catalyst decreases, resulting in a nullification of the value of a jacket for heat-transfer purposes. By the use of the method of this invention, however, the reaction vessel may be of greatly simplified structure and, in some cases, the jacket for the heat-transfer medium may be eliminated.

Figure 2:
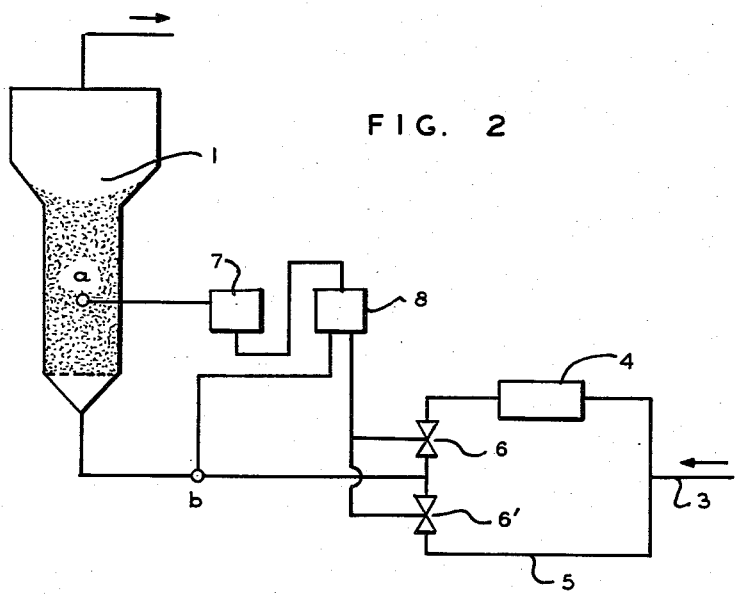

The invention will now be further described with reference to specific examples involving the synthesis of vinyl acetate in fluidized catalyst systems utilizing the reaction temperature control operations of the invention, reference being particularly made to the drawing wherein, FIG. 1 is a diagrammatic sectional view of a reaction vessel adapted for fluidized catalyst reactions and provided with temperature-sensing and flow control means, the system illustrated being suitable for carrying out the process of this invention;

FIG. 2 is a similar view of a modified form of the apparatus system shown in FIG. 1.

Referring to the drawing, and more particularly to FIG. 1, the reaction vessel, designated generally by the reference numeral 1, contains granular catalyst and is equipped at its periphery with a jacket 2 adapted to contain a circulating stream of oil to serve as a heat-transfer agent. The catalyst suitably used is a granular activated carbon which has been impregnated with zinc acetate in conventional manner. The size of the catalyst particles is selected so they will be fluidized by the entering gases under the flow velocities employed in accordance with standard fluidization techniques. The acetylene gas and the acetic acid from any suitable source (not shown) such as a supply of acetylene under pressure and an acetic acid vaporizer, respectively, merge into a single stream of mixed gas containing each component in the desired proportion. This mixed gas, entering by way of line 3, flows into the reaction vessel 1 at its bottom after being preheated and adjusted to a predetermined temperature in relation to the reaction temperature at that moment in the reaction zone defined by vessel 1, through the heat-exchange unit 4 of the temperature regulating system, the bypass 5, and the valves 6, 6' used for regulating the relative proportions of the mixed gas coming from the unit 4 and through the bypass 5. The mixed gas entering vessel 1 fluidizes the catalyst particles and at the same time undergoes reaction, reaching the predetermined reaction temperature. The vinyl acetate vapor thus produced flows out of the upper portion of the reaction vessel 1, together with unreacted acetylene and acetic acid vapor and is condensed and the vinyl acetate recovered in conventional manner, as described, for example, in the above-mentioned Freed U.S. Patent 2,411,962. In the embodiment shown in the drawing, the supply of mixed gas is divided into a parallel circuit wherein either or both streams may be heated or cooled, depending upon the temperature of the entering gas, to make possible the reblending of the streams to give a mixture of the desired temperature. Thus, the heat-exchange unit 4 may be a preheater or a cooler 4 wherein a heat-transfer medium, e.g. oil, is circulated, and the bypass 5, which is exposed to the atmosphere may have a preheating or cooling action. The valve 6, 6' are actuated by the signal received from the automatic control system 7 which in turn responds to the temperature sensing element $a$, which is suitably a thermocouple or like device, and is activated by any variation in the reaction temperature at any given moment. Thus, the raw material mixed gases, e.g. of high temperature, coming from the heat-exchanger 4, and the raw material mixed gases, e.g. of low temperature from the bypass 5, are mixed in the ratio called for by the temperature-initiated signal and the corresponding response of the valves 6 and 6', and the mixture then flows into the reaction zone defined in reaction vessel 1.

In general, adequate control can be obtained by means of the system illustrated in FIG. 1 which employs the regulator 7 which directly operates the valves 6 and 6' in response to a signal corresponding to variations in the internal temperature of the fluidized bed as detected by the sensing element $a$ in the reaction vessel 1, as seen in FIGURE 1, because the heat capacity of the jacket absorbs the variation of internal temperature to some degree, especially when the capacity of the reaction vessel is small, and the relative effectiveness of the jacket is accordingly substantial.

When, however, the reaction vessel is enlarged and the relative effectiveness of the jacket becomes comparatively small, a double control system is advantageously employed. Such a system involves the use of two controllers, as shown in FIGURE 2, one being the controller 7 which responds to changes in the internal temperature of the reaction vessel 1, as in the FIG. 1 system, and the other being the controller 8 which not only responds to the signal received from the controller 7 but which also responds to the temperature of the entering raw material gases, as measured at $b$, and then actuates the valves 6 and 6', thus bringing the temperature at $b$ to the desired value in accordance with the signal from controller 7.

This invention will be further understood from the following specific examples of practical application. However, it will be understood that these examples are not to be construed as limiting the scope of the present invention in any manner. In these examples, all parts are by weight, unless otherwise indicated.

Three examples of operation are tabulated in Table 1 below:

Table 1

|  | Example 1 | Example 2 | Example 3 |
|---|---|---|---|
| Diameter of reaction vessel, meters | 0.4 | 1.0 | 2.6 |
| Amount of catalyst used, liters | 150 | 1,300 | 32,100 |
| Particle diameter of catalyst, mesh | 48–100 | 32–42 | 24–45 |
| Reaction temperature, °C | 180.5 | 190 | 183 |
| Temperature of heat-transfer oil in jacket, °C | 180.5 | 160 | 142 |
| Flow rate of raw material gases, kg. ml./hr. | 1.29 | 13.6 | 15.5 |
| Mol ratio of acetylene and acetic acid | 2.48 | 2.95 | 2.41 |
| Rate of catalyst replacement, percent/day | 3.0 | 2.0 | 1.2 |
| Yield of vinyl acetate, ton/day | 0.215 | 2.30 | 37.0 |
| Average temperature of entering raw material gases, °C | 114.8 | 116 | 108 |
| Heat of reaction, kcal./hr | 2,300 | 24,600 | 394,000 |
| Calories required for preheating the raw material gases, kcal./hr | 2,290 | 24,400 | 310,000 |

Due to the stability of the reaction temperature, outside disturbances such as variations in the flow rates of acetylene or acetic acid, for example, are fully compensated for by the automatic control system, as shown in these examples. Variations within 0.5° C. are sometimes indicated for the reaction temperature. In normal operation, the temperature is controlled almost perfectly to the constant predetermined value and a perfect straight line is obtained on the chart of a recording meter, showing temperature plotted against the time elapsed. The average temperatures of raw material gases at the inlet of the reaction vessel always exhibit variations of several degrees, as shown in the table above, but as described above, the reaction temperature desired may easily be maintained, by the use of the method of controlling the reaction temperature in accordance with this invention, as illustrated in the examples.

In contrast, when an attempt is made to control the reaction temperatures in a fluidized bed only by the regulation of the temperature of the heat-transfer medium circulating through the reaction jacket, while keeping the temperature of the entering raw materials at constant values, the regulation of the reaction temperature, lacking the self-control provided by the present invention, becomes very unstable and unreliable due to the limited cooling effect of the jacket. For example, a 2° C. variation in the reaction temperature is repeatedly found even during stable operation in a reaction vessel of 0.4 meter diameter used in Example 1 of Table 1, and in the case of the reaction vessel having a diameter of 1 meter such as used in Example 2, the variation in the reaction temperature could not be checked, despite the fact that the catalyst used had been considerably reduced in activity, and accordingly, it was impossible to continue the operation.

As previously indicated, the method of the present invention has made it possible to achieve optimum control of reaction temperature by regulating the temperature of the raw material gases introduced into the reaction vessel in the vapor-phase synthesis of compounds such as vinyl-acetate in a fluidized catalytic bed. This method makes it possible to control the reaction temperature easily and surely, irrespective of the size of the apparatus defining the reaction zone.

It will be understood that, unless otherwise indicated, conventional apparatus units are suitably employed in carrying out the process of this invention, including conventional reactors adapted to contain a bed of fluidized catalyst, heat-exchangers, valves, thermocouples, and temperature-responsive control units. A typical suitable reactor, for example, is shown in U.S. Patent No. 2,777,760. Chemical Engineer's Handbook (by John H. Perry, third edition, 1950, pages 1326–1327) shows valves of a type suitable for use in our process, and temperature responsive controllers of a type suited for use as the control units 7 and 8 referred to above are shown, for example, Chemical Engineer's Handbook (ibid., pages 1320–1325).

Similarly, the conditions and relative relationships set forth above are those preferred in carrying out the process of the invention, but it will be understood that other conditions and relationships may be used within the scope of the invention. In general, the operating conditions are those which are conventional for the particular synthesis being carried out in accordance with this invention in a fluidized bed by pre-adjusting the temperature of the entering reactants in relationship to the temperature in the fluidized bed. For example, in the case of the synthesis of a vinyl ester, e.g. vinyl acetate, the conditions described in Freed Patent No. 2,411,962 of reaction temperature, space velocity, molecular ratio of the reactants, and the like, are fully applicable to the present invention. Similarly, any of the conventional catalysts for the reaction being effected by the process of this invention are suitably employed, including the chromite catalysts of Freed. However, it is advantageous to note, in the practical application of the method of this invention that condensation of acetic acid may occur if the temperature of the raw material gases falls sharply. For this reason, it is not feasible to lower the temperature of the raw material gases without limit. However, the temperature may be lowered to a value above that at which acetic acid will condense in the lines through which the raw material gases are passed on their way to the reaction zone.

It will also be understood that various changes and modifications may be made in the embodiments described above without departing from the scope of the invention as defined in the appended claim. It is intended, therefore, that all matter contained in the foregoing description and in the drawing shall be interpreted as illustrative only and not as limitative of the invention.

We claim:

In the process for making vinyl acetate by the exothermic reaction of acetylene and acetic acid in the vapor phase in the presence of a catalyst in finely divided solid form supported in a reaction zone as a fluidized bed by a flowing stream of reactant gas mixture of acetylene and acetic acid through said reaction zone, the improvement which comprises maintaining the walls of said reaction zone that are in heat exchange relation with the catalyst, reactants and reaction product at substantially a predetermined reaction temperature, dividing the flowing stream of reactant gases prior to its entry into the reaction zone into a first portion and a second portion, modifying the temperature of said first portion by passing it through a heat exchanger and thereafter recombining said first and second portions into a single stream of unreacted acetylene and acetic acid prior to entry into the reaction zone, said recombined single stream having a temperature intermediate the temperature of said first and second portions, sensing the temperature in said reaction zone with an automatic temperature sensing device and automatically controlling the ratio of reactant gases constituting said first portion to reactant gases constituting said second portion in response to the temperature in said reaction zone to thereby adjust the temperature of the reactant gases entering said reaction zone to maintain the temperature in said reaction zone substantially constant at said predetermined reaction temperature without substantial temperature differential between the reaction zone and the walls thereof in heat exchange relation with the catalyst, reactants and reaction product.

References Cited in the file of this patent

UNITED STATES PATENTS

| | | |
|---|---|---|
| 2,472,084 | Beller et al. | June 7, 1949 |
| 2,547,916 | Wenner | Apr. 3, 1951 |
| 2,777,760 | Dineen et al. | Jan. 15, 1957 |
| 3,014,959 | Marti et al. | Dec. 26, 1961 |